Figure 1:
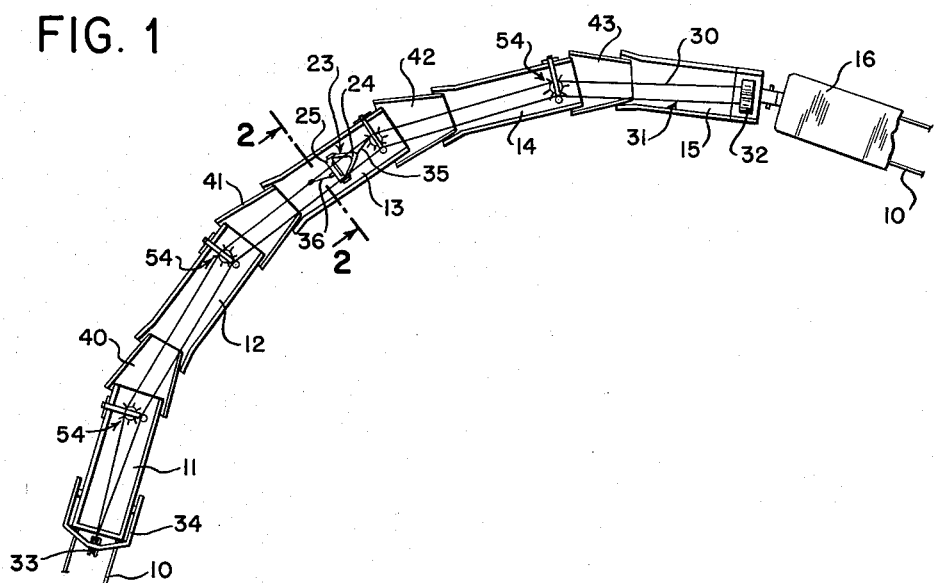

May 2, 1961  C. W. MacQUEEN ET AL  2,982,428
PULLEY APPARATUS

Filed Feb. 3, 1960  2 Sheets-Sheet 1

INVENTORS
Charles W. MacQueen
Jeremy C. Farmin
Richard Maclin Stewart
BY
ATTORNEYS May 2, 1961 C. W. MacQUEEN ET AL 2,982,428
PULLEY APPARATUS
Filed Feb. 3, 1960 2 Sheets-Sheet 2
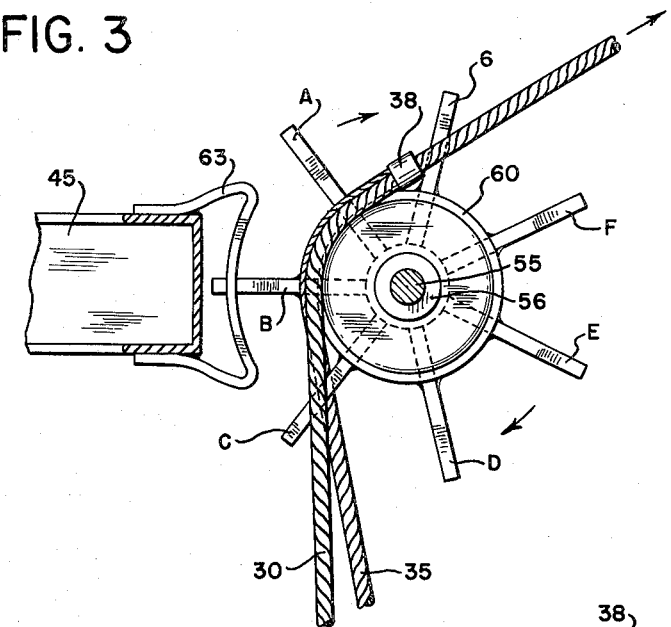
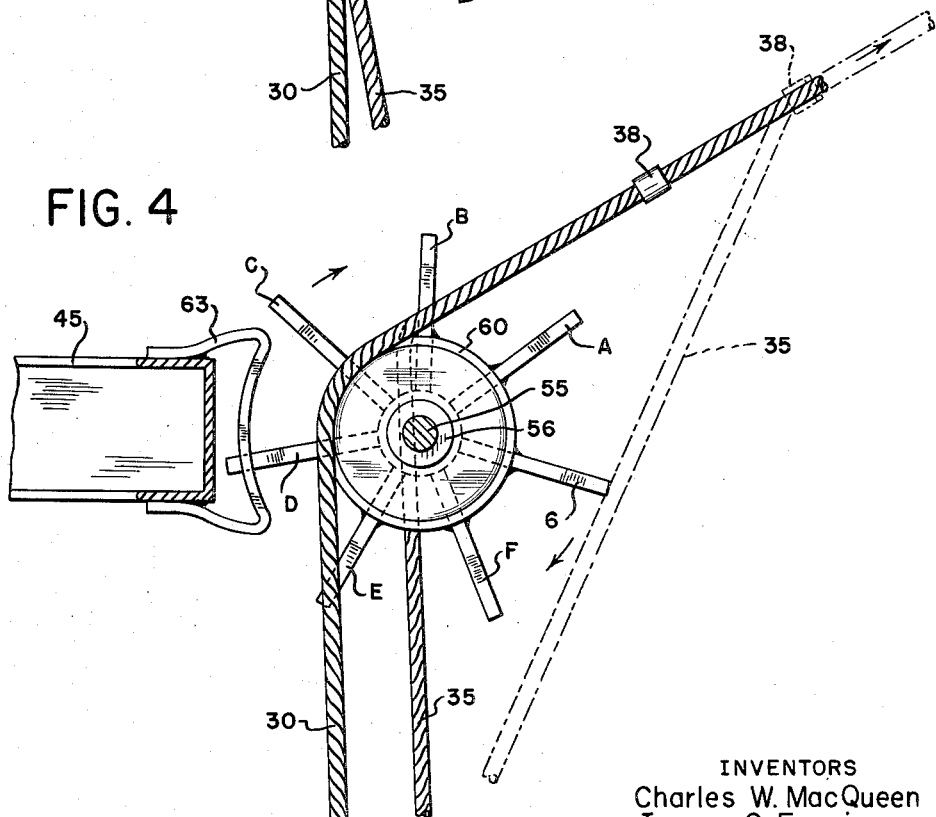
INVENTORS
Charles W. MacQueen
Jeremy C. Farmin
Richard Maclin Stewart
BY
ATTORNEYS United States Patent Office 2,982,428
Patented May 2, 1961

2,982,428

PULLEY APPARATUS

Charles W. MacQueen, Jeremy C. Farmin, and Richard Maclin Stewart, Butte, Mont., assignors to The Anaconda Company, a corporation of Montana Filed Feb. 3, 1960, Ser. No. 6,413

6 Claims. (Cl. 214—85.5)

This invention relates to pulley apparatus for guiding around a curve a drag rope to which one or more branch lines are joined. More particularly, it relates to pulley apparatus which supports the drag rope on an annular rope-guiding seat formed on a rotatable sheave by a plurality of substantially radial spokes and an annular shoulder section.

If a rope, cable, or other line has branch lines attached to it which are under tension, it is very difficult if not altogether impractical to guide it around a curve successfully by means of a conventional pulley. When the junction between such rope or cable and its branch line is carried onto the pulley, the branch line tends to pull the ma n line out of the pulley groove, particularly when the branch line is under tension and extends out of the plane of the pulley. It is almost impossible, therefore, to guide a drag rope around a curve by means of an ordinary pulley when a scraper or similar device is attached to the main line by branch lines, because the drag rope is usually horizontal and the branch lines pull downwardly on it, tending to unseat it from the pulley.

The purpose of this invention is to provide pulley apparatus for guiding branched lines, and particularly scraper drag ropes, around curves in such a manner that the drag rope cannot be carried out of its seat regardless of the tension on the branch lines. Also, the invention aims to achieve this result without relying upon a special construction of either the drag rope, its branch lines, or the junction therebetween, so that any conventional rope, cable or other line may be used successfully with the new apparatus. A further object of the invention is to provide apparatus that is particularly suitable for use with slusher or scraper devices which handle material by being pulled back and forth around curves by a drag rope and a haul-back rope.

The new pulley apparatus comprises a frame which is adapted to be positioned above the drag rope at the curve. A shaft extends downwardly from the frame with its axis inclined at an angle to the vertical, and a sheave is mounted on the lower end portion of the shaft for free rotation about the inclined axis thereof. The sheave comprises a plurality of spokes extending substantially radially outwardly adjacent the lower surface thereof, and an annular shoulder section coaxial with the shaft adjoining the upper edges of the spokes. The upper edges of the spokes diverge from the axis of the shaft at an acute angle relative thereto which is not substantially less and advantageously is a little greater than the angle the shaft axis is inclined from the horizontal. The upper edges of the spokes define with the shoulder section an annular rope-guiding seat, which is tilted from the vertical at the same angle as the shaft. By this construction, the drag rope is adapted to be carried in the upper portion of the tilted rope-guiding seat, and the spokes are adapted to permit the branch lines from the drag rope to pass by the sheave without being able to dislodge the drag rope therefrom.

The invention particularly contemplates the combination of this pulley apparatus with apparatus for loading excavated material into a train of cars. In such loading apparatus, a slusher is attached by branch lines to the drag rope and is adapted to be carried back and forth on rails mounted on the cars and extending substantially the length of the train to distribute the material into each car. In this combination, the above-mentioned frame of the pulley apparatus is attached to the upper edge portion of the side of at least one of the cars, and extends over the rails above the run of the drag rope to which the branch lines are attached. A haul-back pulley advantageously is mounted on the end portion of the frame for carrying the haul-back rope.

In a preferred embodiment of this combination, a bracket is affixed to the upper edge portion of the side of said car. Releasable rigid attachment means are mounted on the bracket for supporting the frame. Also, pivotal attachment means, operable upon release of the rigid attachment means, are mounted on the bracket for pivoting the frame downwardly between the rails substantially into its respective car when the frame is not in use.

By inclining the axis of the rotatable sheave in the manner described, and by defining the tilted rope-guiding seat on the sheave member by radial spokes and an annular shoulder section, the drag rope cannot ride out of the seat when the junction with the branch lines passes over the sheave member. In fact, the tension on the drag rope and the downward inclination of the branch lines out of the plane of the pulley (which heretofore were factors tending to pull the drag rope off the sheave) serve in this new apparatus to hold the drag rope more firmly in its seat. This advantage arises from the unique construction of the sheave in that the spokes rotate upwardly to underlie the drag rope separately from the branch lines and, after carrying the junction around the curve, move downwardly to free themselves of both lines. Hence, there is positive assurance that the drag rope will not pull off the sheave member while being carried around the curve because at no time is there any force exerted upon it which tends to pull it out of its seat.

A particular advantage of the new pulley apparatus is that movement of the drag rope over the pulley when the rope is slack, as when the slusher to which it is attached is being hauled back, does not tend to cause the rope to become unseated from the pulley. This advantage arises from the fact that the axis of the pulley shaft is inclined to the vertical, and the rope-guiding seat is correspondingly inclined to the horizontal. Generally, it is desirable for the pulley shaft to be inclined at least 30° from the vertical (and the plane of the rope-guiding seat to be inclined at least 30° to the horizontal) to insure against dislodgement of the drag rope from the pulley while it is run over it in the slack condition.

Figure 2:
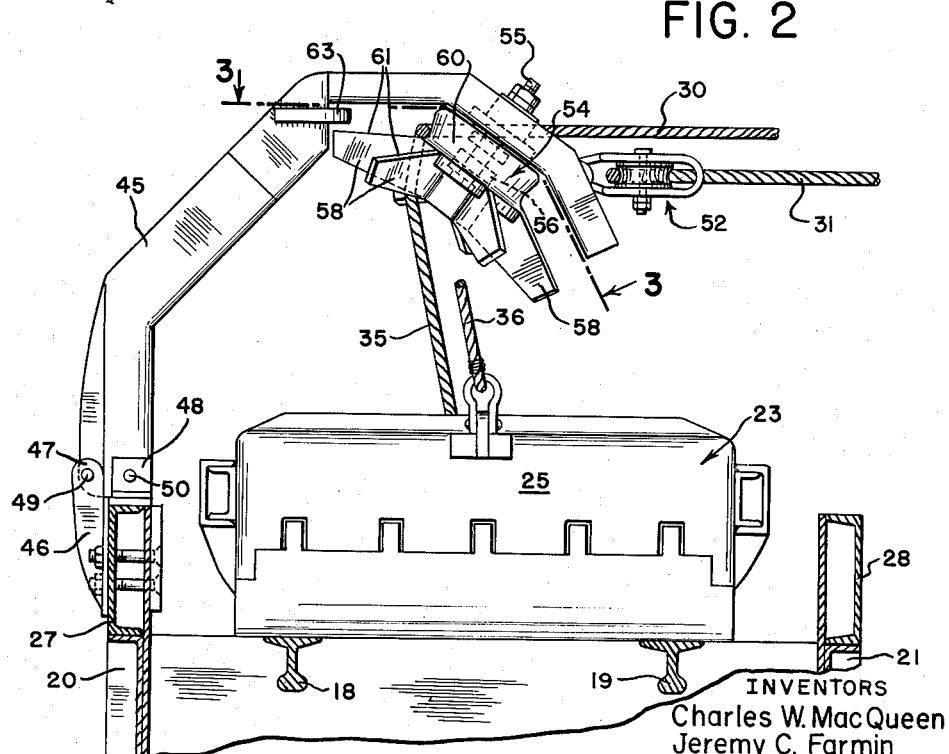

The foregoing and other advantages of this new apparatus will be made clear in the following description of one embodiment of the invention illustrated by the accompanying drawings, wherein Fig. 1 is a plan view of a train of cars in which loading apparatus of the type described above is incorporated in combination with the new pulley apparatus;

Fig. 2 is an enlarged section taken along the line 2—2 of Fig. 1;

Fig. 3 is a section taken along the line 3—3 of Fig. 2 showing the pulley apparatus shortly after the junction between the drag rope and a branch line has passed onto the sheave member; and Fig. 4 is another section taken along the line 3—3 of Fig. 2 showing (in solid lines) the pulley apparatus shortly before the junction has passed the sheave member and (in dotted lines) shortly after the junction has been carried free of the sheave member.

Referring first to Fig. 1, a train of cars is shown standing on a curved length of track 10. The train includes a rearward or tail car 11, several middle cars 12, 13, 14 and 15, and a locomotive 16. (Hereafter in this description, "forward" will refer to the direction toward the forward car 16 and "rearward" will refer to the direction toward the tail car 11.) The locomotive provides means for moving the train along the tracks 10 to a loading station, which may be the face of a mine, tunnel or drift where the excavated material can be loaded into the tail car 11.

In order to distribute the excavated material from the tail car 11 to each of the other cars 12 through 15, the train also includes slushing apparatus. Thus, a pair of rails 18 and 19 are provided on each of the cars substantially at the level of the upper edges of side walls 20 and 21 on each car. (The rails 18 and 19 are shown in section in Fig. 2 but, in the interest of clarity, are omitted from Fig. 1.) The loading apparatus also includes a scraper or slusher 23, of the conventional drag-type having a forwardly extending yoke 24 and a rearward body section 25, which is adapted to be pulled along the rails 18 and 19 over the cars. The body section 25 is sufficiently wide to span the rails 18 and 19, so that excavated material can be scraped along the length of the cars when the cars are full. To prevent the material carried along in this manner from falling off the sides of the cars, side boards 27 and 28 are attached to the upper edges of the side walls 20 and 21 of each car.

The scraper 23 is pulled along the rails 18 and 19 by means of a drag rope 30 which extends from a double-drum scraper hoist 32 on the forward car 15 rearwardly to a tail sheave 33 mounted on a rigid frame 34 above and beyond the end of the tail car 11, and a haul-back rope 31 which extends from the tail sheave 33 back to the hoist 32. The drag rope 30 has relatively closely spaced branch lines 35 and 36 joined thereto which are connected at their outer ends by shackles to the yoke 24 and rearward body section 25 of the scraper 23. The junctions between the drag rope 30 and the forward and rearward branch lines 35 and 36 may be of any suitable design, as indicated by a splice 38 (shown in Figs. 3 and 4) by which the forward branch line 35 is attached to the drag rope 30.

To permit the scraper 23 to carry excavated material from one car to the next as the loading progresses, the loading apparatus includes bridge structures 40, 41, 42 and 43 of substantially channel-shaped lateral cross section which extend between adjoining cars of the train. The floor of each of the bridge structures 40 through 43 is substantially at the level of the rails 18 and 19 and the walls of the bridge structures are approximately as high as the side boards 27 and 28. These bridge structures, which may be of any suitable construction, are designed not to interfere with the passage of the scraper 23 from the rails in one car to the rails in the next car and also not to interfere with the normal relative movement between the cars. Most importantly, however, the bridge structures permit the scraper 23 to be pulled from one car to the next without losing its load of excavated material when the preceding car is full.

When the train is standing on a curve, however, as shown in Fig. 1, the drag rope 30 cannot pull the scraper 23 in either direction because the tail sheave 33 is far out of line with the hoist 32. Therefore, the new pulley apparatus of the invention is incorporated in combination with the train. One unit of this new pulley apparatus is mounted on each of the cars 11 through 14 of the train at the forward end of the respective cars on the outside of the curve. Fig. 2 shows the unit of the pulley apparatus which is mounted on the car 13 just forwardly of the scraper 23.

The pulley apparatus includes a rigid frame 45 which is affixed at its lower end to the side wall 27 on the upper forward edge of the car. Stationary brackets 46 are secured to the side board 27 and include two sets of ears 47 and 48 between which the foot of the frame 45 is adapted to rest. Pins 49 and 50 extend through each of the sets of ears 47 and 48, in sliding engagement with the foot of the frame 45. The inner pin 50 is permanently seated whereas the pin 49 can be pulled out when desired. Thus, the frame 45 can be lowered by removing the pin 49 and turning the outer end of the frame downwardly about the pin 50 such that substantially all of the frame lies within the side boards 27 and 28 of the car, thereby reducing the clearance of the train. Together, the ears and pins 47 through 50 serve as releasable rigid attachment means for supporting their frame on the car, while the ears 48 and pin 50 alone operate as pivotal attachment means when the pin 49 is removed.

The frame 45 arches over the rails 18 and 19 and a conventional pulley 52 is secured to its outer end to carry the haul-back rope 31 which is not attached to the scraper 23. To accommodate the drag rope 30 which is attached to the scraper 23, a sheave member 54 is provided. The sheave member 54 is rotatably mounted about a shaft 55 affixed to the end of the frame 45 and extending downwardly at an angle in the general direction of the mounting of the frame 45. The sheave member 54 is mounted on the shaft 55 on roller bearings 56.

Included in the sheave member 54 are a plurality of spokes 58 extending substantially radially outwardly therefrom adjacent the free end of the shaft 55. Also, an annular slightly conical shoulder section 60 adjoins and diverges from straight upper edges 61 of the spokes. These upper edges 61 of the spokes themselves diverge from the axis of the shaft 55 at an included angle relative thereto which is just slightly greater than the angle at which the axis of the shaft 55 is inclined from the horizontal. Thus, at the highest point in their rotation, the upper edges 61 of the spokes 58 slope slightly upwardly toward their outer ends immediately beneath the portion of the frame 45 adjacent the shaft 55.

The upper edges 61 of the spokes 58 and the conical surface of the shoulder section 60 therefore define an annular rope-guiding seat which is tilted perpendicular to the shaft. That portion of the frame 45 which overlies the spokes 58 at their highest point of travel extends over and around the outer end of the rope-guiding seat to form with the spokes an aperture through which the drag rope 30 is directed. As is shown most clearly in Figs. 3 and 4, a rigid concavely curved guide member 63 is secured to the frame 45 to close off substantially the outer end of this aperture to insure that the drag rope 30 does not work off the ends of the spokes.

As the scraper is pulled forwardly by the drag rope 30 from its position on the car 13 shown in Fig. 1, the splice 38 connecting the forward branch line 35 to the drag rope 30 approaches the sheave member 54. The sheave member 54, of course, rotates freely about the shaft 55 and before the splice 38 reaches the sheave member only the drag rope 30 is carried in the rope-guiding seat formed by the upper edges 61 of the spoke 58 and the shoulder section 60. The inclined angle of the sheave member and the conical shape of the shoulder section 60 prevents the drag rope 30 from working upwardly along the shoulder section 60, and the angle of the upper edges 61 of the spokes relative to the shaft prevents the drag rope 30 from working outwardly along the spokes. Also, the overlying portion of the frame 45 insures that the drag rope 30 is contained on the sheave member even if it did somehow start to work out of its rope-guiding seat.

When the splice 38 comes into tangential engagement with the sheave member 54, one of two conditions can occur. Either (1) the rearwardly directed included angle between the branch line 35 and the drag rope 30 is large enough so that the next spoke on the sheave member immediately rotates upwardly over the branch line 35 and under the drag rope 30 or else (2) the rearwardly directed included angle is so small that the next spoke rotates upwardly beneath both the branch line 35 and the drag rope 30. The size of the rearwardly directed included angle between the branch line 35 and the drag rope 30 is primarily a function of the length of the branch line 35 and the height of the sheave member above the rails 18 and 19.

If the first condition occurs, the drag rope 30 will be immediately supported to each side of the splice 38 by two adjacent spokes and the branch line 35 will depend downwardly between the spokes to the scraper. Then, as the sheave member rotates further, the splice 38 will be carried around the curve and the spokes on each side of the splice 38 will rotate downwardly to free themselves of both the branch line 35 and the drag rope 30. This, of course, is what happens when the splice between the rearward branch line 36 is carried onto the sheave member because then the rearwardly directed included angle between the branch line 36 and drag rope 30 is obtuse and quite large enough to admit the next spoke over the branch line 36.

However, it is usually the case with the forward branch line 35 that the second condition occurs, i.e., that the rearwardly directed included angle between the branch line 35 and the drag rope 30 is so small that the spokes rotating up immediately behind the splice 38 are not directed over the branch line 35. Consequently, as the splice 38 continues around the sheave member, one or more subsequent spokes rotate up under both the branch line 35 and the drag rope 30. This condition is shown in Fig. 3 where the splice 38 had come in contact with the sheave member and the spokes A and B rotated upwardly under both the branch line 35 and the drag rope 30.

The effect of this action is that the length of the branch line 35 between the drag rope 30 and the scraper 23 is effectively shortened and the rearwardly directed included angle between the branch line 35 and the drag rope 30 is thereby progressively increased. The number of spokes which must pass under the branch line 35 before this rearward included angle opens wide enough varies, of course, but eventually a spoke will pass over the branch line 35 and under the drag rope 30. In Fig. 3, the spoke C is shown as the first to rotate above the branch line 35 in this manner.

Upon further rotation of the sheave member 54, the upper edge 61 of the spoke C rotates upwardly to underlie the drag rope 30 and the branch line 35 is thereafter carried solely by the preceding spoke B. In Fig. 4, the sheave member is shown (in solid lines) in its position where the spoke A has rotated downwardly free of both the branch line 35 and the drag rope 30. The spoke B is also rotating downwardly but still underlies the branch line 35. The spoke C, which was the first to underlie only the drag rope 30 rearwardly of the splice 38, has passed its high point and is beginning to rotate downwardly also. The other spokes D, E, F and G are all rotating upwardly to underlie the drag rope 30 successively in the same manner as before the splice 38 engaged the sheave member 54. Further rotation of the sheave member 54 from the position shown in Fig. 4 (in solid and dotted lines) causes the spoke B to rotate downwardly to the point where the branch line 35 slides off its outer end and snaps to the position shown in dotted lines completely free of the sheave member. The operation of the pulley apparatus is, of course, exactly the same when the scraper 23 is pulled rearwardly toward the tail car 11, since the apparatus itself is symmetrical and the branch lines can be carried around it from either direction.

Thus, the drag rope 30 and the branch line 35 depending downwardly therefrom are both carried around the sheave member 54 without causing the drag rope to be pulled out of its rope-guiding seat on the sheave member. At no time is a force exerted on the drag rope which tends to pull it in any direction other than down into the rope-guiding seat formed by the spokes 58 and the body section 60 of the sheave member. Hence, the scraper 23 can be dragged forwardly from the car 13 onto the bridge 42 and then to the car 14, and an identical unit of the new pulley apparatus on the car 14 is there to insure that the drag rope is again carried around a curve toward the next car in the train. In this manner, the scraper 23 can be pulled from one end of the train to the other even though the train is standing on a relatively sharp curve.

We claim:

1. Pulley apparatus for guiding around a curve a drag rope from which branch lines depend, said apparatus comprising a frame adapted to be positioned above said drag rope at said curve, a shaft extending downwardly from said frame with its axis inclined at an angle to the vertical, a sheave mounted on said shaft for free rotation about the inclined axis of said shaft, said sheave having a plurality of spokes extending substantially radially outwardly from the lower surface thereof and an annular shoulder section coaxial with said shaft adjoining the base of said spokes, said spokes having upper edges diverging from the axis of said shaft at an included angle relative thereto which is greater than the angle said axis is inclined from the horizontal, said upper edges of the spokes defining with said shoulder section an annular rope-guiding seat, whereby said drag rope is adapted to be carried in said rope-guiding seat and said spokes are adapted to permit passage by the sheave of said branch lines.

2. Pulley apparatus for guiding around a curve a drag rope from which branch lines depend, said apparatus comprising a rigidly mounted frame having a supporting arm extending over said drag rope from the outside of said curve, a shaft affixed to said frame arm and extending downwardly therefrom with its axis inclined downwardly and toward the outside of said curve, a freely rotatable sheave mounted on said shaft for rotation about the inclined axis thereof, said sheave comprising a plurality of spokes extending substantially radially outwardly from the lower surface thereof and an annular substantially conical shoulder section adjoining and diverging upwardly from the base of said spokes, said spokes having straight upper edges diverging from the axis of said shaft at an included angle relative thereto which is not substantially less than the angle said axis is inclined from the horizontal, said upper edges of the spokes defining with said shoulder section an annular rope-guiding seat, whereby said drag rope is adapted to be carried in said rope-guiding seat and said spokes are adapted to permit passage by the sheave of said branch lines.

3. In combination with apparatus for loading excavated material into a train of cars wherein a scraper attached by branch lines to a drag rope is adapted to be pulled back and forth on rails mounted on the cars and extending substantially the length of said train to distribute the material into each car, pulley apparatus on at least one of said cars for guiding said drag rope and said branch lines when said train is standing on a curve, said pulley apparatus comprising a frame attached to the upper edge portion of the side of the car and extending over said rails above the drag rope, a shaft extending downwardly from said frame with its axis inclined at an angle to the horizontal, a sheave mounted on the lower end portion of said shaft for free rotation about the inclined axis of said shaft, said sheave having a plurality of spokes extending substantially radially from the lower surface thereof and an annular shoulder section coaxial with said shaft adjoining the base of said spokes, said spokes having upper edges diverging from the axis of said shaft at an included angle relative thereto which is greater than the angle said axis is inclined from the horizontal, said upper edges of the spokes defining with said shoulder section an annular rope-guiding seat, whereby said drag rope is adapted to be carried in said seat and said spokes are adapted to permit passage by the sheave of said branch lines.

4. In the combination of claim 3, a bracket affixed to the upper edge portion of the side of the car, releasable rigid attachment means on said bracket for supporting the pulley-carrying frame, and pivotal attachment means on said bracket operable upon release of said rigid attachment means for pivoting the frame downwardly between said rails substantially into the car when the frame is not in use.

5. In combination with apparatus for loading excavated material into a train of cars wherein a scraper attached by branch lines to a drag rope is adapted to be pulled back and forth on rails mounted on the cars and extending substantially the length of said train to distribute the material into each car, pulley apparatus on at least one of said cars for guiding said drag rope and said branch lines when said train is standing on a curve, said pulley apparatus comprising a frame attached to the upper edge portion of the side of the car and extending over said rails above the drag rope, a shaft affixed to said frame extending downwardly therefrom with its axis inclined downwardly and toward the mounting of the frame on the side of the car, a freely rotatable sheave mounted on the lower end portion of said shaft for rotation about the inclined axis thereof, said sheave comprising a plurality of spokes extending outwardly from the lower surface thereof and an annular shoulder section adjoining the base of said spokes, said spokes having upper edges diverging from the axis of said shaft at an included angle relative thereto which is not substantially less than the angle said axis is inclined from the horizontal, said upper edges of the spokes defining with said shoulder section a rope-guiding seat, a portion of said frame adjacent the sheave member extending over the upper portion of said tilted rope-guiding seat and forming therewith an aperture in which said rope is received, said spokes serving to permit passage by the sheave of said branch lines.

6. In the combination of claim 5, a bracket affixed to the uper edge portion of the side of the car, releasable rigid attachment means on said bracket for supporting the pulley-carrying frame, and pivotal attachment means on said bracket operable upon release of said rigid attachment means for pivoting the frame downwardly between said rails substantially into the car when the frame is not in use.

No references cited.